INVENTOR
THOMAS A. DEPREZ

BY Cushman, Darby & Cushman
ATTORNEYS

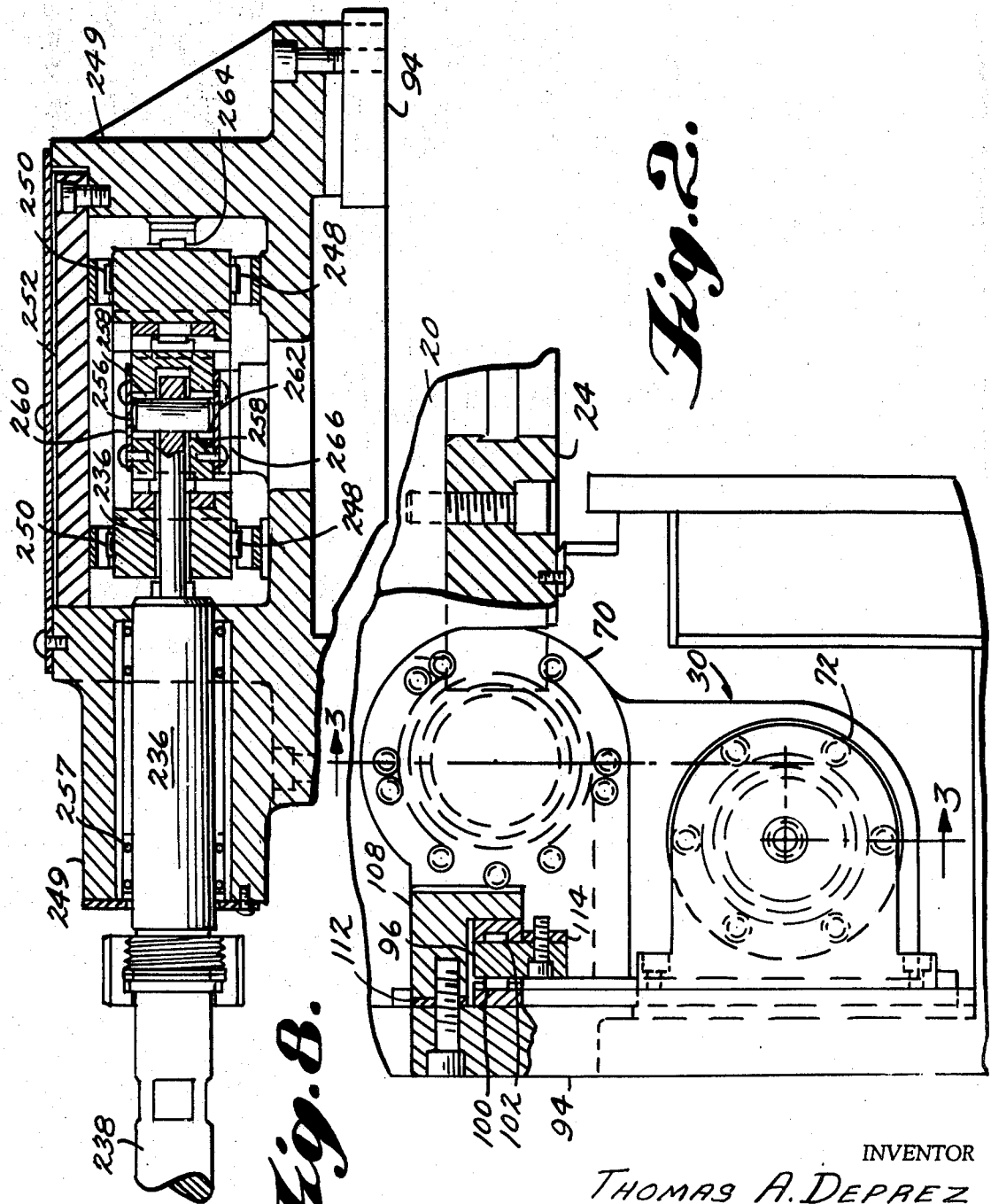

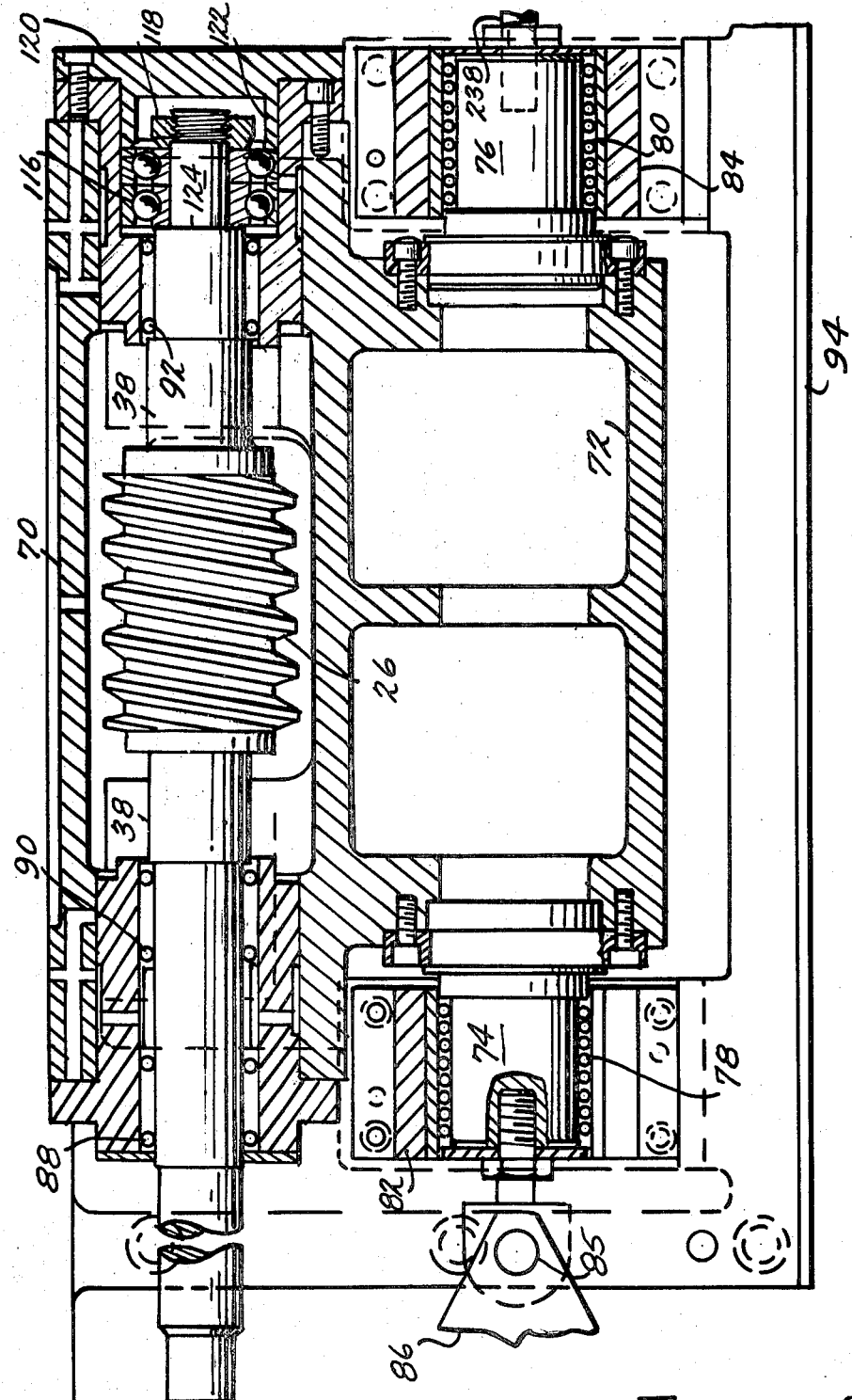

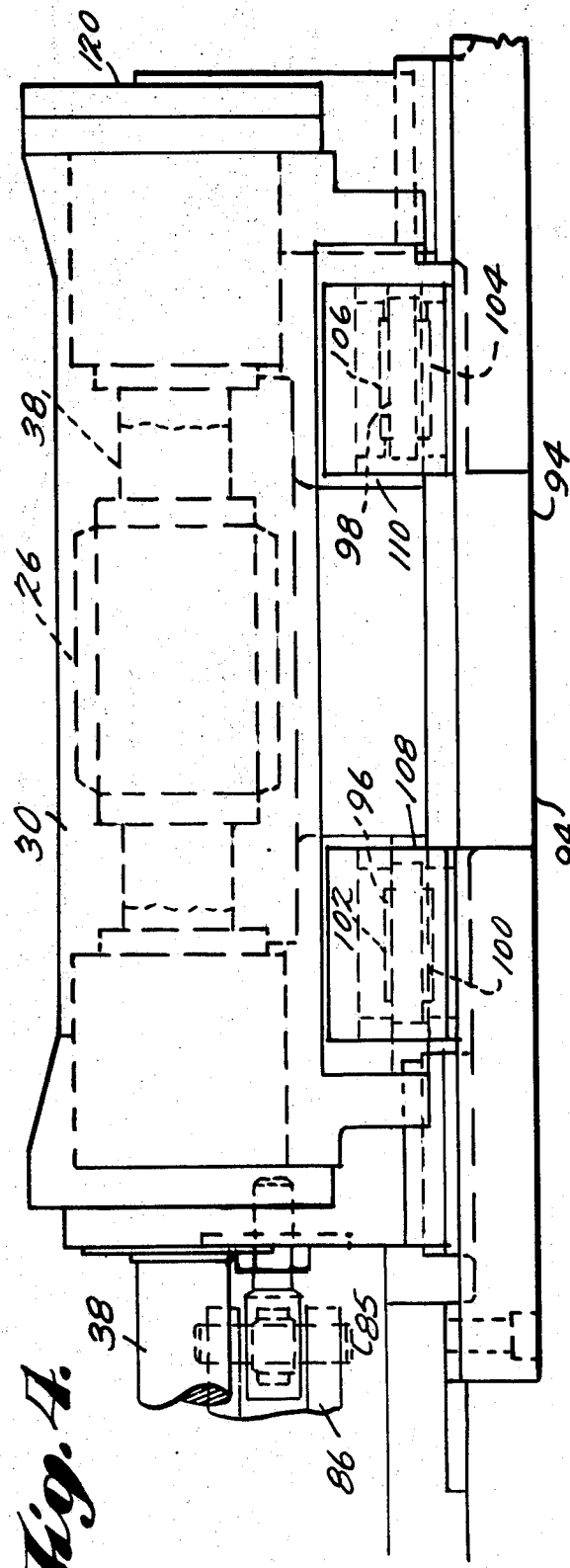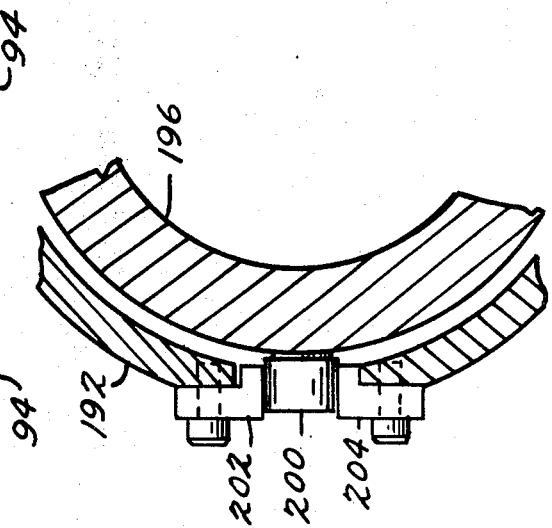

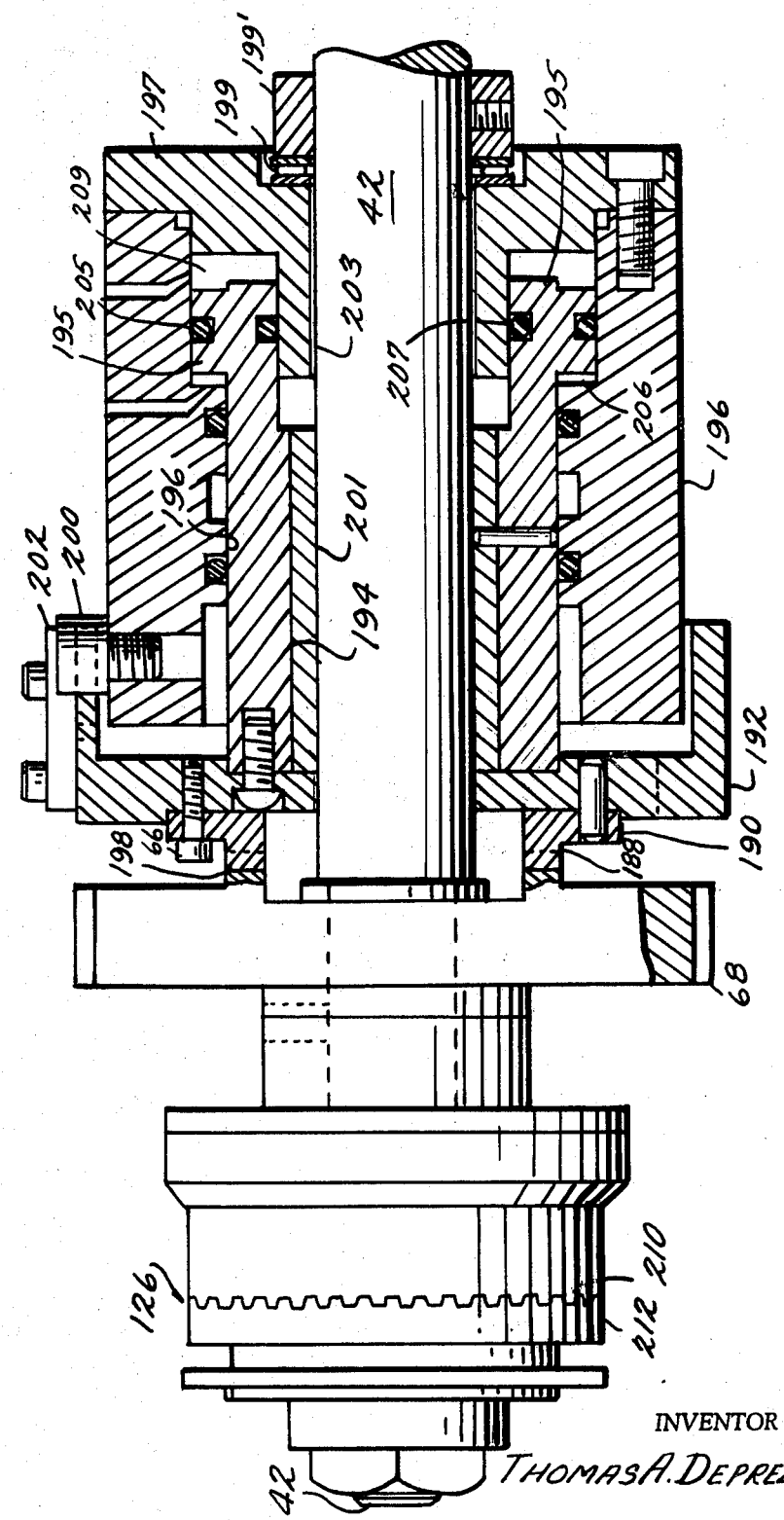

March 23, 1971     T. A. DEPREZ     3,572,175
INDEXING MECHANISM

Filed March 3, 1969     6 Sheets-Sheet 6

*Fig. 7.*

INVENTOR
THOMAS A. DEPREZ

BY Cushman, Darby & Cushman
ATTORNEYS

United States Patent Office 3,572,175
Patented Mar. 23, 1971

3,572,175
INDEXING MECHANISM
Thomas A. Deprez, Rochester, N.Y., assignor to The Gleason Works, Rochester, N.Y.
Filed Mar. 3, 1969, Ser. No. 803,752
Int. Cl. B23q 17/06
U.S. Cl. 74—825         14 Claims

ABSTRACT OF THE DISCLOSURE

An electro-optical system is used for precisely controlling the position of a rotary member during intermittent indexing movements thereof. A linear grating or scale is arranged on the periphery of a rotary member and an electrical controller is operatively connected to a correction index motor for turning the rotary member in accordance with readings taken of the linear grating to effect corrective indexing of the rotary member after it has been initially partially indexed by a separate mechanical index drive.

There is also provided an anti-backlash feature, and an index lock-up device acting directly on the drive worm.

---

The present invention relates to structures and methods for intermittent indexing operations of rotating members. It is adapted especially but not exclusively for machine tools, wherein such structures serve to periodically advance a work supporting member through a succession of predetermined angular increments.

A principal objective of the present invention is to provide index mechanisms and methods for intermittently positioning a workpiece relative to a tool with improved accuracy and precision. While the present invention was designed for use in connection with the production of toothed face members, such as clutches or couplings, it will be evident that the methods, structures and principles involved may be utilized in other applications where it is desired to have a work member accurately and precisely indexed, intermittently, and in incremental angular movements.

The indexing mechanism of the present invention has special application in machines for grinding toothed face members such as the machine disclosed in the copending application, Ser. No. 803,683, entitled "Apparatus and Methods for Grinding Toothed Face Members," filed of even date herewith, and the disclosure of that application is incorporated herein by reference. The apparatus and method disclosed in that application were designed especially to handle a range of sizes of workpiece so as to enable the machine to handle workpieces of considerable size. One of the uses of toothed face members of that size is in the turbine industry where considerable accuracy and precision is needed in tooth-to-tooth spacing, as will be understood. Thus, in connection with forming the teeth in the workpiece, it is essential that the indexing operation be precise so that the teeth may be cut in precise, predetermined positions in the workpiece.

The present invention provides a work indexing mechanism capable of producing precise, intermittent rotary indexing movements of the workpiece. Broadly speaking, the invention contemplates the use of means for automatically controlling the indexing movements, during the indexing function, so that the work table, on which the workpiece is mounted, will be stopped precisely at the correct, predetermined position for the next tooth cutting operation. Somewhat more specifically, the present invention contemplates the provision of a corrective indexing operation for the work table, effected after an initial indexing step and operating automatically in response to readings taken of the position of the work table after the initial indexing step has been completed.

In the illustrative embodiment of the invention, the work table is connected to a concentrically mounted worm wheel, and the initial indexing movements of the worm wheel are effected through rotational and axial movements of a driving worm engaged thereto. During initial indexing, the worm is rotated a certain amount by a first drive and translated axially a certain amount by a second drive, and the corrective indexing arrangement includes means for reading the position of the table after the initial indexing step has been completed and then feeding the information concerning that position through a suitable controller for operating the second indexing drive operating to translate the worm and to rotate the work table through the necessary angle to bring the work table to the precise, desired position for the next tooth cutting cycle. As contemplated in the exemplary arrangement to be described hereinbelow, the corrective indexing arrangement includes a linear grating or scale provided on a circumferential peripheral surface of the work supporting member so as to utilize the Moiré effect through a reading head operating in an electrical-optical system for reading the line grating or scale and utilizing that information to effect correcting movements, as desired, of the work supporting member.

Another object of the invention is to provide a novel index lock-up device operatively connected to the shaft for rotating the driving worm, in work indexing mechanisms of the type under consideration. The purpose of this lock-up is to assure that the driving worm has been rotated through the set, pre-established angular distance, and located in proper position after it has moved through that distance. In the illustrative embodiment of this feature of the invention, a clutch utilizing toothed face members formed with a high degree of accuracy is provided between the lock-up device and the driving shaft connected to the driving worm, and it is contemplated that this clutch be disengaged during an indexing movement but that upon the completion of an indexing movement it be engaged in such fashion that unless the driving worm has been moved through a certain angular distance for that indexing movement, as indicated by a mesh between the clutch members, the clutch will operate to effect some further limited or fine rotational movement of the driving worm to make up for any differences or errors. In this connection, it will be understood that the number of teeth in this clutch will be designed in combination with the particular indexing requirements of a given workpiece.

Other objects of the invention reside in the provision of novel combinations and subcombinations of methods and structures, as set out above, resulting in improved and more precise indexing operations.

Further objects and advantages of the invention will be in part obvious and in part pointed out hereinafter.

The novel features of the invention may best be made clear from the following description and accompanying drawings in which:

FIG. 2 is an enlarged and fragmentary end elevational view of a worm and worm bracket assembly and related structure constituting an exemplary embodiment of the corresponding structures shown schematically in FIG. 1.

FIG. 3 is a vertical sectional view taken along the line 3—3 of FIG. 2.

FIG. 4 is a fragmentary plan view of the structure shown in FIG. 2.

FIG. 5 is an enlarged and partially sectioned view of an exemplary arrangement of an index lock-up embodying the invention.

FIG. 6 is a fragmentary sectional view taken along line 6—6 of FIG. 5.

FIG. 7 is an enlarged and fragmentary bottom plan view of part of a corrective index mechanism constituting an exemplary embodiment of corresponding structure shown somewhat schematically in FIG. 1.

FIG. 8 is a sectional view taken generally along the line 8—8 of FIG. 7.

DETAILED DESCRIPTION

Figure 1:
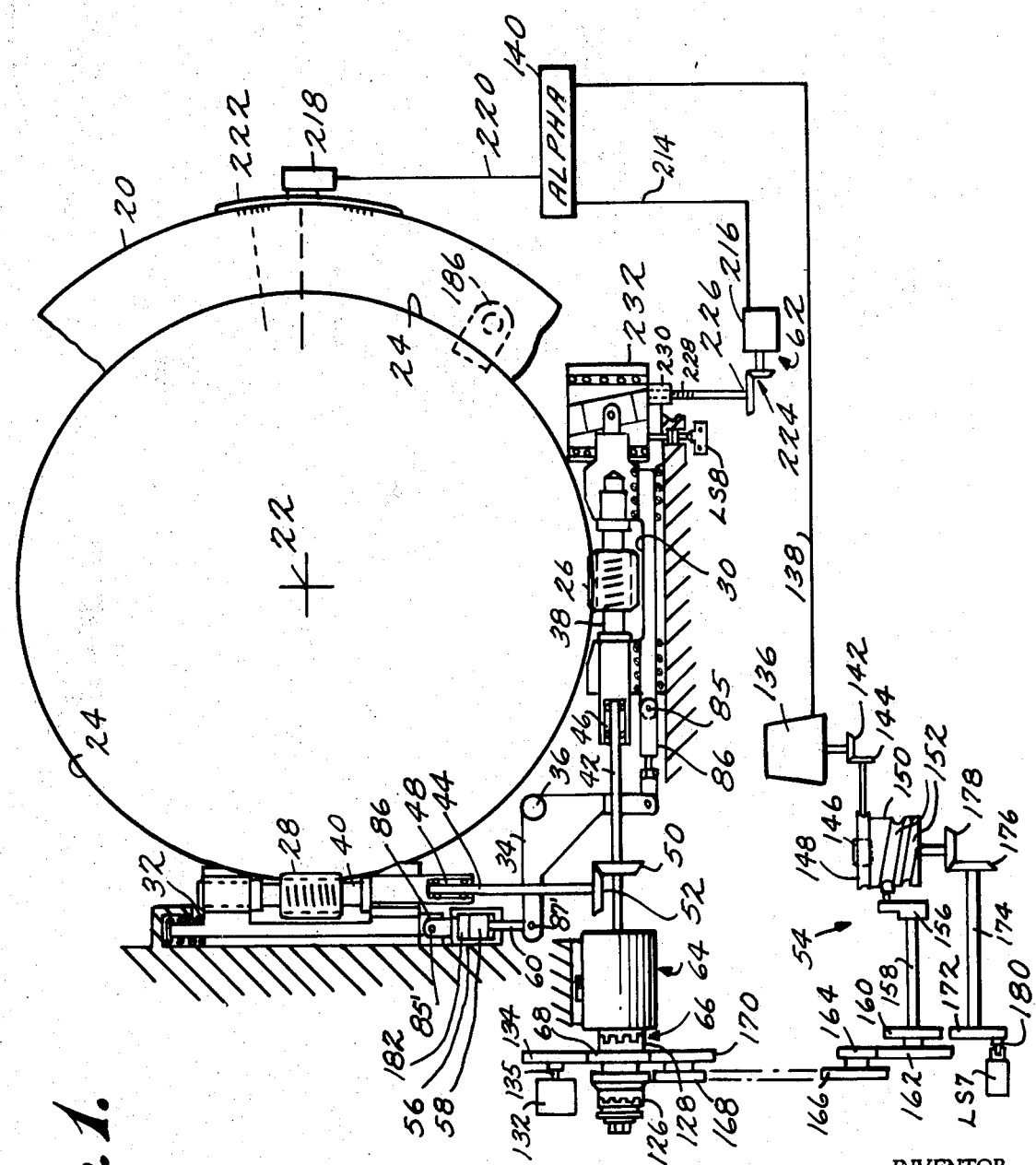
FIG. 1 is a schematic plan view of a work indexing mechanism embodying the invention.

Referring now to the drawings wherein like reference numerals have been used to designate corresponding parts, a work table 20 is shown fragmentarily in FIGS. 1 and 2, mounted for rotation about a vertical axis 22 and including a worm wheel 24 affixed coaxially thereto. The work table, as will be understood, may be suitably mounted in a machine or the like, and it was especially designed for use in machines for grinding toothed face members, such as the machine disclosed in the copending application, Ser. No. 803,683 referred to above. It will be understood, however, that the methods, structures and principles of the present invention may be applied to indexing mechanisms used in connection with other machines and in operations for producing different kinds of work from that disclosed in that copending application, as will be evident.

An exemplary indexing mechanism of the invention is shown in FIG. 1 as including two worms 26, 28 arranged at right angles to each other and in engagement with the worm wheel 24. Worm 26 will be the drive worm used during indexing operations, and the other worm 28, among other things, will serve the purpose of providing an anti-backlash feature, as will become apparent. As will be described in more detail hereinbelow, the worms 26, 28 are journalled in brackets 30, 32 respectively, these brackets being suitably mounted in the machine, normally in stationary position but capable of some limited sliding movement, at certain times and under certain conditions, wherein the brackets will move with their respective worms in a straight line or rectilinearly so that the worms move axially. The brackets 30, 32 are shown as being connected together by a bell crank lever 34 pivoted to a fixed or stationary pivotal axis 36 by suitable means engaged to the machine. The axles 38, 40 for the worms 26, 28 respectively are drivingly connected to shafts 42, 44 as by conventional ball spline joints 46, 48 and these shafts are drivingly connected together through the bevel gears 50, 52.

The indexing or driving worm 26 is connected through shaft 42 to a conventional intermittent, mechanical indexing mechanism 54. This indexing mechanism 54 may be of any suitable construction, and, as shown, it is of the type disclosed in the U.S. Pat. No. 3,007,345, and to the extent needed for a fuller understanding of the operation of that index structure, as used with the present invention, the disclosure of that patent is incorporated herein by reference.

The present invention contemplates the provision of an anti-backlash feature, as indicated, and in the illustrative embodiment thereof, this feature is shown as including the worm 28 and an hydraulic cylinder 56 and piston 58 and piston rod 60 arrangement connecting the bracket 32 to the bell crank lever 34, as shown. The present invention also contemplates the provision of a novel corrective indexing means 62 utilizing, in the illustrative embodiment thereof, a second index drive operatively connected to the right hand end of the bracket 30 as shown in FIG. 1, and also connected through an electrical controller to a means for reading the angular position of the work table, as will be described in more detail hereinbelow. Another feature of the present invention is the provision of a novel index lock-up means 64 shown in the illustrative embodiment thereof as being operatively connected through a clutch 66 to a gear 68 in the mechanical index drive train.

THE WORM BRACKETS

As shown in FIGS. 1–4, the illustrative structure for the worm bracket 30 there shown includes an upper housing portion 70 receiving the worm 26, as shown, and a lower housing portion 72. It will be understood that the brackets 30, 32 may be of similar or substantially identical design, hence the following description for the bracket 30 shown in FIGS. 2–4 may be applied to the bracket 32 for the worm 28, as will be evident.

The lower housing portion 72 is shown as being hollowed out and including trunnions 74, 76 connected to either end thereof and journalled in bearings 78, 80 carried by supports 82, 84 fastened to the machine frame. The construction is such that the trunnions 82, 84 may have limited axial movement in bearings 78, 80.

Trunnion 74 is connected by suitable structure including pivot pin 85 to a linkage member 86, connected in turn to the bell crank lever 34 through a pivot pin 87, as indicated in FIG. 1. In connection with initially installing the bracket 30 in the machine frame and engaging the worm 26 carried thereby to the worm wheel 24, the trunnions 74, 76 and bearings 78, 80 will permit limited pivoting or swinging of the bracket about the axis of trunnions 74, 76, before connection to linkage 86 or bell crank lever 34, as will be evident.

The axle 38 for the driving worm 26 is journalled in suitable radial bearings 88, 90, 92 provided in the upper bracket housing portion 70, and the left hand end of the axle extends outwardly through the bracket 30 for driving connection through the ball spline joint 46 to the drive shaft 42, as indicated in FIG. 1. The right hand end of the worm axle 38, as viewed in FIGS. 1 and 3, is suitably connected to the corrective index drive, as through a fixed connection between the bracket 30 and the corrective index drive as indicated in FIGS. 1, 3 and 8, and as will be referred to again hereinbelow.

Suitable structure is provided so that the bracket 30 will be free for limited, sliding reciprocating motion along or parallel to the axis of worm 26 and relative to the machine frame 94 and work table 20. As shown, this means includes two spaced bearing plates 96, 98 connected to the upper housing portion 70 of the bracket 30, and bearing members 100, 102, 104, 106 providing ways receiving these two bearing plates 96, 98 as best seen in FIGS. 2 and 4. These bearings are held in position by caps or mounts 108, 110 suitably connected to the machine frame 94, and mounted in recesses or the like in the upper housing bracket, as shown. Shims 112, 114 may be utilized, as shown in FIG. 2, for maintaining the proper engaged relation between the worm 26 and worm wheel 24, in connection with initially mounting bracket 30 in the machine. As indicated above, at the time the bracket is initially mounted in the machine, it may be swung or pivoted bodily about the axis of its trunnions 74, 76 to properly engage the worm with the worm wheel, after which shims of the proper size will be selected, as indicated by numerals 112, 114.

The bodily sliding movement of the bracket 30, relative to the machine frame, will likewise effect a bodily movement of the driving worm 26 carried thereby along its own axis, and this movement will be called for during corrective indexing, as will become apparent. The bracket trunnions 74, 76 are axially slidable, within a limited range, in their respective bearings, as will be evident, and the right hand end of the worm axle 38 is shown as being connected to a thrust bearing structure 116 which will constrain or prohibit axial movement of the worm 26 relative to the bracket 30. As shown, a lock-up nut 118 is screwed onto the end of the worm axle 38, and a cap 120 having a depending annular shoulder 122 thereon closes the adjacent end of the bracket 30, with the shoulder 122 of the cap cooperating with a shoulder 124 on the worm axle 38 and with the thrust bearing 116 and nut 118 to prevent axial movement of the worm 26 relative to the bracket 30, as will be evident.

Thus, the bracket 30 may be conveniently mounted in the machine frame in proper position for engagement of the worm 26 with the worm wheel, by means of the pivoting action permitted by the trunnions 74, 76 and once the proper angular positioning of the bracket has been effected, it will be retained in that position as through the use of shims 112, 114 of proper size, and the entire bracket assembly will be capable of limited sliding or reciprocatory motion along a straight line so that the driving worm 26 may be moved bodily along its own axis.

MECHANICAL INDEX DRIVE

The mechanical index drive 54 to the shaft 42 for the form 26 is shown in FIG. 1 as being connected to gear 68, which in turn is releasably drivingly connected to the shaft 42 through a set-over clutch 126 which may be of conventional construction, and the index lock-up device 64 is shown as being releasably engaged to the hub 128 of the gear 68 through clutch 66. Both of these clutches 66, 126, are shown as including mating toothed face members, and a tramming motor 132 is shown as being drivingly connected to the gear 68 through a gear 134 on the output shaft 135.

Mechanical index motor 136 is shown operatively connected through line 138 to an alpha controller 140 and is drivingly connected through gears 142, 144 and worm 146 and worm wheel 148 to the index cam 150. Index cam 150 is provided with cam grooves 152 therein engageable by rollers 154 carried by a segment 156 fixed to shaft 158 carrying the gear 160. Gear 160 is fixed for coaxial drive with gear 162 which meshes with gear 164, the latter being coaxial with gear 166 drivingly connected to the gear 68 through gears 168 and 170, as shown. These gears 68, 166, 168, 170 constitute change gears, and the size and number of teeth therein will be pre-selected in accordance with the indexing requirements for a particular workpiece, as will be understood.

During mechanical indexing, gear 68 with its integral face clutch will not be in engagement with the mating clutch member of the index lock-up device 64, and the rotation of this gear 68 during indexing will drive the shaft 42 through the set-over clutch mechanism 126, as will be understood. During indexing and during regular machine operation, the tramming gear 134 will be removed, thereby completely disconnecting the tramming motor 132 from the driving worm 26.

The mechanical indexing mechanism 54 is also shown as including a gear segment 172 connected through shaft 174 and gears 176, 178 to the index cam 150, and a limit switch, LS7, is arranged for actuation by an actuator or projection 180 carried by the gear segment 172, whereby the motor 136 will be stopped after one revolution of gear segment 172, as will be understood. The structure and operation of the gears 160, 172 and the index cam 150 will be the same as, or essentially the same as, the corresponding structure disclosed in the patent mentioned above.

The tramming motor 132 and gear 134 are utilized to effect a slow and continuous rotation of the work table 20, as desired, through the gear 68 and the set-over clutch 126 to the shaft 42 and drive worm 26. As during a mechanical index operation, the clutch elements for the clutch 66 of the index lock-up device 64 are disengaged, and the tramming operation will normally be employed only for truing the workpiece in initially placing and fixing the workpiece on the work table. In order to prepare for a tramming operation, the index change gear 170 will be removed, thus rendering the mechanical index 54 nonoperative. Furthermore, it is contemplated that suitable means be provided so that gears 134 and 170 cannot both be in position in engagement with gear 68 at the same time.

As indicated above, the worms 26, 28 will be axially constrained in but rotatable relative to their respective worm brackets 30, 32. The worm brackets are slidable relative to the machine frame 94, but bracket 30 is normally constrained from such slidable movement by structure in the corrective indexing system, to be described hereinbelow.

When the drive worm 26 is rotating, the backlash take-up worm 28 (of the same hand as worm 26) driven by the gears 50, 52 will also be rotating and it will be free of any significant forces on its teeth at such time inasmuch as pressure will be released from the chamber 182 in the backlash take-up cylinder 56, as previously indicated. When the worms 26, 28 are rotating, the axial position of the backlash take-up worm 28 and its bracket 32 will be controlled by the worm and wheel tooth engagement within the very small limits of backlash in this engagement. It can move axially to and fro within this small limit by reason of no other axial restraint on bracket 30, with no pressure in the take-up cylinder 56, and by reason of the ball spline connection 48 with the shaft 44 carrying the gear member 52 of the miter set to which it is connected for rotation.

When pressure is admitted to the chamber 182 of take-up cylinder 56, the force on the piston 58 is carried through the pivot connection 87 to the bell crank 34 and the connecting linkages to worm bracket 30, to urge worm 26 to the right, as viewed in FIG. 1, and against the worm wheel 24. The corresponding pressure acting on the cylinder 56 forces the bracket 32 and worm 28 upwardly, as viewed in FIG. 1, through the linkage 86 and the pivot connection 85. This forces the "coasting" side of the teeth of worm 28 against the meshing wheel teeth, urging the wheel clockwise, as viewed in FIG. 1, and firmly against the driving side of worm 26, thereby effecting a tight backlash free system such as to rigidly control the work table angular position.

During a mechanical indexing operation effected through motor 136, the pressure in chamber 182 will be vented or off, so that the brackets 30, 32 will be in a normal position wherein no pressure or forces are exerted on the worm wheel 28 from the piston 58 and cylinder 56 arrangement. And the brackets 30, 32 will be suitably restrained from any slidable motion, as, for example, by connection of the right hand end of the bracket 30, as viewed in FIG. 1, to a part of the corrective indexing system as will be described in more detail hereinbelow.

During a mechanical indexing operation, the clamp 186 on the table will be released. This clamp may be of any conventional construction, operated, for example, by hydraulic pressure. At the completion of a mechanical indexing step, fluid under pressure will be introduced into chamber 182 to effect an anti-backlash feature, as discussed above.

INDEX LOCK-UP DEVICE

An exemplary structure for the index lock-up device 64 is shown in FIGS. 5 and 6. This device is shown as including clutch member 188 integral with an element 190 fastened to an adapter 192 by suitable structure, and this adapter 192, in turn, is suitably fastened to a tubular piston 194 having a piston head 195. Piston 194 is shown as being slidably mounted in a cylinder 196 so that this piston and the element 190 and adapter 192 will slide as a unit, relative to the cylinder 196 in connection with releasing or engaging the clutch member 188 with member 198 of the clutch 66. Suitable means are provided for preventing rotation of the piston 194 within the cylinder 196, and such structure is shown as including a roller 200 and guides 202, 204 closely fitting the roller 200 on either side thereof. The roller 200 is shown as being carried by the cylinder 196 and the guides 202, 204 are shown as being carried by the adapter 192.

The cylinder 196 is closed by a cap 197 and a thrust bearing 199 is mounted in a recess in cap 197 by collar 199' fixed to shaft 42 by a set screw, as shown.

Shaft 42 extends through the piston 194 and through the gear 68 for driving connection to clutch member 212. Shaft 42 will be rotatable relative to the gear 68, piston 194 and cap 197. A bushing 201 surrounds the shaft 42 and cap 197 has a depending annular sleeve 203, also encircling the shaft, as shown. Sealing rings 205, 207 are provided in the piston head 195, as shown.

During a mechanical indexing function, or when tramming, the clutch members 188 and 198 will be disengaged by withdrawing the piston 194 through the introduction of fluid under pressure into the chamber 206 shown in FIG. 5 to the left of the piston head 195. Rotation of change gear 68 will drive clutch members 210, 212 through suitable structure and suitable means are also provided for releasably drivingly connecting member 212 to shaft 42, as will be understood.

The purpose of the index clutch 66 is to enhance work table index accuracy from the mechanical indexing system 54. In order for the index lock-up clutch 66 to be operable, each mechanical indexing step must involve a turning of the index worm 26 through an exact integral number of pitches of the index clutch 66 as will be understood. Thus, there exists or will be a relationship between the number of teeth in the work piece, the ratio of the table drive worm 26 and wheel 24, and the number of teeth in the index lock-up clutch members 188, 198. Then, to produce the required number of integral index lock-up clutch pitches turned by the worm 26, the correct change gears 166, 168, 170, 68 must be chosen. It will be evident that a given number of teeth in the index lock-up clutch 66 provides for a variety of choices of tooth numbers in a workpiece depending on the change gearing just mentioned. Likewise, certain workpiece tooth numbers will require a different number of teeth in the lock-up clutch 66. Interchangeable parts 68 and 188 may be made available for this purpose, and a chart relating change gear tooth numbers and clutch may be provided in this connection. The highly accurate index lock-up clutch 66 of toothed face construction, if brought very slightly out of perfect tooth register, for example, by inaccuracies, backlash, etc. in the index train ahead of the clutch 66, will be brought into perfect registry by its reengagement following the indexing step, thus providing extremely accurate turning of the index worm 26 to make the mechanical indexing step, effected by motor 136, more precise. The structure (not shown) providing the drive from the change gear 68 to the shaft 42 may also provide for fine manual, angular adjustment of the work table and workpiece relative to the grinding wheel or tool for purposes of precision alignment of workpiece teeth to other elements in the workpiece, such as bolt holes, after the workpiece is fastened to the work table, as will be understood. This fine adjustment feature and the mechanism for producing it are not novel, by themselves, and they may be of any conventional design, as will be understood.

CORRECTIVE INDEXING SYSTEM

An exemplary arrangement of a precision corrective indexing system embodying the invention is shown in FIGS. 1, 7 and 8. As shown in FIG. 1, the alpha controller is connected by a line 214 to an index correction motor 216, and this motor is connected to the right hand end of the worm bracket 30, as shown in FIG. 1, as will be described in more detail hereinbelow. The alpha controller, in the illustrative arrangement under consideration, may be of conventional electrical controller design utilizing a tape having information thereon, and a tape reader (not shown), as referred to in the copending application, Ser. No. 803,683, mentioned above. An alpha head or scale reader 218 is shown as being provided adjacent the work table 20, and it connects through line 220 to the alpha controller constituting an arrangement for feeding back into the alpha controller information concerning the angular displacement of the work table, as will become evident. In this connection, the work table 20 is provided, in the exemplary embodiment thereof, with a linear grating or scale 222 completely around the periphery thereof, and designed to be read by the alpha head or scale reader 218, in a manner understood in the art.

The scale 222 preferably is composed of horizontally-spaced vertical lines running parallel to the axis of the work table and equally spaced around the periphery of the work table, for example, including 1,000 lines per inch. The alpha head or scale reader 218 preferably is constructed to include a plurality of lines arranged at an angle to the lines on the linear grating or scale 222 and means will be provided utilizing the Moiré fringe effect to determine precisely, through optical interference patterns, the amount of angular displacement of the work table during indexing movements, as is understood. This information, as read from the optical interference pattern, will be fed back through line 220 to the alpha controller to be utilized in the electrical control system to effect continued operation of the index correction motor 216 until the work table has been rotated through the precise, predetermined angular distance for the particular indexing step, as recorded in a feed demand register in the alpha controller, as will be understood, and as is discussed in the copending application referred to above. The alpha controller will operate in conjunction with the scale reader or head 218 to stop the index correction motor 216 after the work table has been moved through the precise, predetermined angular distance thereof required for that particular indexing step, as predetermined by the feed demand register in the alpha controller.

As best seen in FIG. 1, the index correction motor 216, which in the illustrative embodiment thereof is of the reversible drive type, is connected through right angle gearing 224 to the shaft 226 having a lead screw portion 228 formed thereon and threadedly engaged within a nut 230 mounted on a wedge carrier 232, as best seen in FIGS. 7 and 8. The screw 228 and the nut 230 may be of the ball screw and nut type, of conventional design, and as shown, the shaft 226 and screw 228 will be arranged in a fixed axial position, but free to rotate, while the nut 230 will be fixed against rotation, but will be free for limited rectilinear movement with the wedge carrier 232 as will be evident.

A wedge block 234 is arranged within the wedge carrier, and is drivingly connected to the right hand of the worm bracket 30, as viewed in FIGS. 1, 3 and 7, by means of a linkage member 236 suitably connected to the end of the worm bracket, as through a rod 238 connected to the trunnion 76 of the bracket, as seen in FIG. 3.

Structure is provided so that straight line motion of the wedge carrier 232, as effected through rotation of the shaft 226 and lead screw 228, will operate to produce a lateral movement of the wedge block 234 and in a direction along the axis of the worm 26 or parallel thereto so as to produce a corresponding axial bodily movement of the worm 26, in turn producing a corresponding rotary or angular movement of the worm wheel 24. Such structure is shown as including two complementarily tapered wedges or wedge bars 240, 242 arranged in fixed positions in the wedge carrier 232, as shown, and held therein by suitable structure, such as the adjusting screws and rods 244. These wedge bars will preferably have slightly tapered but parallel internal surfaces 241, 243 (see FIGS. 1 and 7) arranged for sliding engagement to bearings 246 carried at the four corners of the wedge block 234, as best seen in FIG. 7.

The wedge carrier 232 is suitably arranged within the machine frame 94 for limited horizontal movement thereof, and shown, it is mounted on bearings 248 arranged in a bracket 249 mounted on the machine frame 94, as best shown in FIGS. 7 and 8, and similar bearings 250 are arranged in engagement with the opposite or upper surfaces of the wedge carrier, these latter bearings being shown as carried by a cover plate 252 attached to the machine frame above the wedge carrier. While the terms "above" and "below" have been used in connection with describing the positions of various parts in this machine, the attitude and the location of the various parts may be modified as desired, so that although the work table 20 is arranged for rotation about a vertical axis, in the illustrative embodiment, and other parts are oriented in their attitude relative to that particular disposition of the work table, it will be understood that the novel structures and methods of the invention may also be utilized in connection with work tables disposed at different angles so that, for example, the axis of the work table may be horizontal, or at any desired angle relative to the vertical.

The wedge block 234 and wedge bars 240, 242 are shown as being arranged in a large central cut-out portion 254 in the wedge carrier 232, and the link member 236 is shown as slidably extending through the bracket 249 and the wedge carrier 232 and into the wedge block 234 for connection to the wedge block by means of a pin 256 extending therethrough. This pin is shown as being journaled in bearings 258 carried between caps 260; 262 on the block 234, and the pin 256 may be press-fitted in a hole in the member 236. Bearings 257 are provided in the bracket 249 engaging the link member 236, as shown.

Bearings 264 are shown in FIGS. 7 and 8 as being carried by the bracket 249 for engagement to the sides of the wedge carrier 232, and bearings 266 are also shown as being carried by the bracket 249 and in engagement with the lower surface of the wedge block 234.

Limit switch, LS 8, is shown in FIG. 7 as being provided at the end of the wedge carrier 232. This switch is shown as including an actuating button 268 designed to be engaged by an actuator in the form of an adjustable screw 270 carried by a nut member 272 mounted on the wedge carrier, as shown. This switch functions in the electrical control system, under the control of the alpha controller, in a manner described in the copending application Ser. No. 803,683, referred to above, and some discussion of its function will also be given hereinbelow.

Thus it will be seen that during the operation of the index correction motor 216, the shaft 226 and lead screw portion 228 thereof will be rotated, and this rotation will in turn effect a limited sliding movement of the wedge carrier 232, either up or down as viewed in FIG. 7, depending upon the direction of rotation of the shaft 226. Such sliding movement of the wedge carrier 232 will effect a lateral movement of the wedge block 234 (perpendicular to the movement of the carrier 232) through the action of the tapered surfaces 241, 243 of the wedge bars 240, 242 acting on the wedge block, as will be evident. And this lateral movement of the wedge block 234 will effect a corresponding rectilinear motion of the link or rod member 236 along its axis to produce a corresponding axial bodily motion of the worm 26 and its associated bracket 30, thereby resulting in a limited rotation or angular displacement of the worm wheel 24 and work table 20. Thus the corrective index system 62 will operate precisely to control the angular position of the work table and assure that the indexing step will move the work table the precise, predetermined angular distance desired for that particular indexing step, as will be evident. Although other corrective indexing arrangements may be used, it is preferred to move the worms 26 and 28 axially (rather than rotationally) to substantially reduce friction.

OPERATION

The operation of the indexing mechanism of the invention will now be described. As indicated in the copending application, Ser. No. 803,683, referred to above, this indexing mechanism may be utilized in a machine for producing toothed face members such as clutches or couplings, and the indexing mechanism when used in connection with rough grinding operations will not correct through the corrective indexing drive 62. In a finish grinding operation, however, in the machine disclosed in that application, both the mechanical indexing drive 54 and the corrective index drive 62 will operate under the control of the alpha controller and the feed demand register therein to effect a more precise intermittent indexing of the work table, as will be evident.

When only the mechanical indexing drive 54 is utilized, the following sequence of operations occurs in the exemplary embodiment under consideration:

(1) The table clamp 186 will be released.

(2) The index lock-up clutch 66 will be disengaged (by the introduction of fluid under pressure into chamber 206) and pressure will be released from the chamber 182 in the hydraulic backlash cylinder 56 (1 and 2 may be simultaneous).

(3) The mechanical index motor 136 will be operated to produce two turns of the index cam 150 which in turn will produce a desired amount of rotation of the worm 26 for indexing the work table.

(4) The index motor 136 will be stopped.

(5) The index lock-up clutch 66 will be engaged by release of pressure in chamber 206 and introduction of pressurized fluid into chamber 209, and pressure will be admitted to the chamber 182 in the backlash take-up cylinder 56.

(6) The table clamp 186 will be operated to clamp the table.

This sequence of operations is indicated in the copending application Ser. No. 803,683, referred to above, as being under the control of the alpha controller operating through electrical, mechanical and hydraulic circuit arrangements, as disclosed in that application.

When it is desired to have a more precise indexing operation, as during finish grinding in connection with machines of the type disclosed in that application, then the mechanical index 54 will be operated together with the reader 218 and the corrective index drive 62 in the following exemplary sequence:

(1) The table clamp 186 will be released.

(2) The index lock-up clutch 66 will be disengaged and pressure will be released from the chamber 182 in the hydraulic backlash take-up cylinder 56. (1 and 2 may be simultaneous.)

(3) The mechanical index motor 136 will be operated to produce two turns of the index cam 150, and at the same time, the correction motor 216 will be operated in reverse direction to retract the wedge carrier (a downward movement thereof as shown in FIG. 1) until the screw 270 strikes and actuates the button 268 of the limit switch, LS8, and at this time the motor 216 will be stopped and held in that position.

(4) The index motor 136 will be stopped.

(5) The index lock-up clutch 66 will be engaged and pressure will be admitted to the chamber 182 in the backlash take-up cylinder 56.

(6) The correction motor 216 will be operated or rotated in a forward direction, in response to the readings taken by the alpha reader 218 and operating through the alpha controller 140 to advance the wedge carrier 232 (an upward movement thereof as viewed in FIG. 1) until the feed demand register in the alpha controller is satisfied that the table has rotated to the precise position thereof called for, as read through the head 218 and scale 22. (It should be noted that step 3 always results in the table stopping short of the correct position because the reverse rotation of the correction motor 216 will operate to move the worm 26 axially, for example, to the left as viewed in FIG. 1, whereby a subtracting motion will be imparted to the initial mechanical indexing step— in other words, the rotation of the worm 26 effected through the mechanical index drive 54 will advance the worm wheel 24, say, clockwise as viewed in FIG. 1, and the reverse rotation of the correction motor 216, in step 3, will subtract something from that initial mechanical indexing step, so that this combined initial indexing motion will always results in the table stopping short of the indexing position demanded whereby in step 6, during the index correction, there will always be a forward or advancing movement of the wedge carrier 232.)

(7) The correction motor 216 will be stopped and held.

(8) The table clamp 186 will be actuated to clamp the table.

It will thus be seen that the objects of this invention have been fully and effectively accomplished. It will be realized, however, that the foregoing specific embodiments have been shown and described only for the purpose of illustrating the principles of the invention and are subject to extensive change without departure from such principles. Therefore, this invention includes all modifications encompassed within the spirit and scope of the following claims.

What is claimed is:

1. In a method of intermittently indexing a work supporting member through a succession of predetermined angular distances, wherein a first index drive and a second index drive are operatively connected to said member, and wherein said first and second index drives are operatively interconnected, the improvement which comprises in an indexing step: performing an initial indexing displacement of said member by actuating both said first index drive and said second index drive, and after completion of said initial indexing displacement, automatically effecting a corrective indexing displacement of said member by actuating said second index drive, wherein said corrective indexing displacement is smaller in magnitude than said initial indexing displacement, the actuation of said first and second index drives being under the control of an electrical system in which, at the end of said initial indexing displacement, a signal is automatically given corresponding to the amount of further indexing displacement necessary for said work supporting member to be indexed through said predetermined angular distance.

2. The method of claim 1 wherein said initial indexing displacement is performed by actuating both said first index drive and said second index drive simultaneously.

3. Mechanism for intermitently indexing a rotatable work supporting member through a succession of predetermined angular distances, said mechanism including: a rotatable work supporting member; an index driving arrangement operatively connected to said member, means for actuating said driving arrangement to impart an initial indexing displacement to said member, means for measuring and indicating the amount of said initial indexing displacement; and a control system operatively connected to said driving arrangement and operative in response to the indication of said measuring and indicating means automatically to impart a corrective indexing displacement to said member so that the combined initial and corrective indexing displacements will equal the predetermined angular distance, said index driving arrangement including: a worm wheel connected coaxially to said member and a first worm engaging said wheel, a predetermined angular distance, and second index drive means for imparting an axial motion to said first worm, said first and second means being actuated to impart said initial indexing displacement to said member, and said second means being actuated to impart said corrective indexing displacement to said member.

4. Mechanism according to claim 3 wherein said mechanism includes a locking device associated with said first index drive means for rotatably locking said first worm after rotation of the worm through its said predetermined angular distance, said mechanism including a second worm engaged to said worm wheel and rotatably connected to said first worm, and means for imparting opposing axial forces to said two worms after rotation of said first worm through its said predetermined angular distance.

5. The method defined in claim 1 wherein said signal is given in response to a reading automatically taken of the position of said member at the termination of said initial indexing movement.

6. The structure defined in claim 4 wherein said first means includes a shaft drivingly connected to said worm and a gear drivingly connected to said shaft, and wherein said locking device for rotatably locking said first worm comprises a clutch operatively engageable to said gear.

7. The structure defined in claim 6 wherein said clutch includes mating, toothed face members in releasable engagement to each other, one of said face members being carried by said gear and the other of said members being carried by structure outside of said driving arrangement.

8. The structure defined in claim 6 and further including a second worm engaged to said worm wheel, and means for imparting axial forces to said two worms whereby said worm wheel will be locked against rotation at the completion of an indexing movement.

9. Mechanism for intermittently indexing a rotatable work supporting member through a succession of predetermined angular distances, said mechanism including: a rotatable work supporting member; a corrective drive means operatively connected to said member; precision means for indicating the amount of angular displacement of said member; a control system operatively connected to said corrective drive means and including said precision means; said control system further including means for periodically actuating said drive means to impart limited rotary movement to said member in response to indications from said precision means so that the operation of the drive means will be under the control of said precision means; said mechanism further including additional drive means operatively connected to said member and to said control system, means for actuating said additional drive at the beginning of an indexing operation to impart limited rotary movement to said member before said corrective drive means operates under the control of said precision means; said additional drive means including a worm and a worm wheel, said worm being mounted in a slidable bracket, and said corrective drive means being operatively engaged to said bracket, said additional drive means operating to rotate said worm, and said corrective drive means operating to move said worm axially.

10. The structure defined in claim 9 and further including means for also operating said corrective drive means at the same time as said additional means, and not under the control of said precision means so that before said corrective means is operated under control of said precision means said member will be short of the predetermined angular displacement thereof required for a complete indexing movement through said distance.

11. The structure defined in claim 9 wherein said precision means includes a linear scale grating arranged around the periphery of said member.

12. The structure defined in claim 9 wherein said corrective drive means includes: a reversible motor and an output shaft; wedge means operatively connected to said bracket; and a lead screw and nut arrangement drivingly connected to said shaft and said wedge means.

13. A driving arrangement of the character described including: a worm wheel, a driving worm and an anti-backlash worm engaged to said wheel at spaced points thereon, said worms being drivingly connected together, first means for periodically rotating said driving worm, second means for periodically applying oppositely directed axial forces to said worms, and third means for rendering said second means non-operative during rotation of said driving worm and operative when said driving worm is not rotating, said worms being arranged in brackets; and said third means being arranged between said brackets and including fluid-pressure actuated means designed (1) to force said brackets and said worms apart when they are not being rotated and (2) to place no axial forces on said worms when they are rotating.

14. Mechanism for intermittently indexing a rotatable work supporting member through a succession of predetermined angular distances, said mechanism including: a rotatable work supporting member; an index drive train operatively connected to said member and including a gear member, an index lock-up device comprising a clutch releasably operatively engaged to said gear member, said clutch including mating toothed face members in releasable engagement to each other, one of said face members being carried by said gear member and the other of said members being carried by structure outside of said drive train.

References Cited

UNITED STATES PATENTS

| 2,786,360 | 3/1957 | Cameron | 74—822UX |
| 2,876,661 | 3/1959 | Jaeger | 74—825X |
| 2,949,796 | 8/1960 | Frederick et al. | 74—823 |

FRED C. MATTERN, Jr., Primary Examiner

F. D. SHOEMAKER, Assistant Examiner

U.S. Cl. X.R.

74—821, 822

UNITED STATES PATENT OFFICE
CERTIFICATE OF CORRECTION

Patent No. 3,572,175          Dated March 23, 1971

Inventor(s)  THOMAS A. DEPREZ

It is certified that error appears in the above-identified patent and that said Letters Patent are hereby corrected as shown below:

Claim 3, column 11, after line 59, insert

--first index drive means for rotating said first worm thr(

Signed and sealed this 13th day of July 1971.

(SEAL)
Attest:

EDWARD M. FLETCHER, JR.          WILLIAM E. SCHUYLER,
Attesting Officer                Commissioner of Pate